Oct. 13, 1959 H. R. WARREN 2,908,770

MAGNETIC RECORDING-REPRODUCING

Filed April 30, 1956 2 Sheets-Sheet 1

INVENTOR.
Henry Ray Warren
BY Morris A. Rabkin
ATTORNEY.

MAGNETIC RECORDING-REPRODUCING

Filed April 30, 1956 2 Sheets-Sheet 2

INVENTOR.
Henry Ray Warren
BY
Morris L. Rabkin
ATTORNEY.

United States Patent Office 2,908,770

Patented Oct. 13, 1959

2,908,770

MAGNETIC RECORDING-REPRODUCING

Henry Ray Warren, Haddonfield, N.J., assignor to Radio Corporation of America, a corporation of Delaware Application April 30, 1956, Serial No. 581,599

10 Claims. (Cl. 179—100.2)

The present invention relates to magnetic recording-reproducing apparatus, and more particularly to an improved magnetic record transducer.

In the magnetic record transducer, provided by the present invention, the transducer assembly comprises readily detachable elements. One of these elements is the portion of the transducer adapted to directly cooperate with the recording medium in transferring magnetic signals between the transducer and the medium.

The recording medium makes sliding contact with the portion of the transducer that is adapted to transfer the magnetic signal during normal operation of the recording-reproducing apparatus. This subjects the recording medium contacting portion of the transducer to wear. After a period of use, the wear ordinarily becomes excessive and the transducer is replaced. The amount of wear which necessitates replacement of the transducer may be considered minute by ordinary standards. However, the record contacting portion of the transducer, which is adapted to transfer the magnetic signal, is required to maintain its shape and alignment to close tolerances in order to perform in accordance, with specified operating conditions. Under such circumstances, even minute amounts of wear, which would be otherwise negligible, can prevent the desired performance.

Currently used magnetic recording media are tapes which are coated with para-magnetic materials. These materials constitute very fine but effective abrasives. The repeated passage of such abrasive material in contact with the surface of the transducer produces sufficient wear to decrease the effectiveness and deteriorate the response characteristic of the transducer to an extent that it does not perform according to the specified operating conditions.

It will be appreciated that replacement of an entire transducer entails a considerable expense. A large part of the cost of a transducer is in the elements thereof which are not subject to wear. In a transducer provided by the present invention, these elements, which are not subject to wear, are detachable from the record contactign elements which are subject to wear. Consequently, a considerable cost saving is afforded in the replacement of only those elements which are subject to wear. Also, delicate assembly operations may be performed when constructing the element which is subject to wear.

Known transducers consist of cores of magnetic material upon which signal translating coils are wound. These cores define a gap across which the magnetic signal appears which is transferred into the transducer during recording and out of the transducer during record reproduction or playback. It has been proposed to provide replaceable pole tips on the core to define the signal translating gap. Such pole tips are cemented to the cores and may be discarded after a period of use. Cemented pole tips still leave much to be desired in the way of cost reduction and simplified replacement of the worn structure since the entire transducer must be removed for pole tip replacement and new tips positioned by delicate and tedious operations. The core which is to be equipped with replacement pole tips is involved in the extensive fine work known to be necessary to meet proper size and alignment tolerances. It follows that replacement of new cemented pole tips has been very expensive.

By means of the present invention, it has become no longer necessary to perform the required fine work on an assembled transducer structure. An independently manufacturable sub-assembly containing pole elements that contact and transfer the magnetic signal directly to the recording medium is provided. This sub-assembly may be detachably secured to any corresponding core structure which would include the signal translating coils, and when secured thereto a unitary structure is afforded which is the completed transducer. Thus, several sub-assemblies may be provided as spare parts for a single core structure. As one sub-assembly wears, it may be readily replaced with a spare.

In accordance with one form of the present invention, pole elements are secured in suitable support structures and form a sub-assembly of the transducer. The sub-assembly is designed to correspond to the main assembly of a transducer. The pole elements are disposed to complement the core structures in the main assembly so that, when the transducer is assembled, the pole elements are magnetically coupled to the cores. Specified operating conditions for the transducers are met by securing the pole elements in assembled detachable structures, which are adapted to cooperate with corresponding core structures, in accordance with the invention.

Since the pole elements, which define the signal gap, are secured in separate structures, they can be manufactured independently of the cores to the required high tolerances and may be accurately aligned. In many transducers, the signal gaps must be of molecular dimensions. Thus, it will be appreciated that the provision of separate structures, in which accurate tolerances may be met, affords a distinct advantage over heretofore known devices.

Accordingly, it is an object of the present invention to provide an improved magnetic-recording-reproducing-transducer, which incorporates readily replaceable pole elements.

It is another object of the invention to provide an improved magnetic recording-reproducing transducer having a replaceable pole element structure, which may be independently manufactured to the tolerances desired to produce accurately and well defined signal gaps.

Another feature of the present invention resides in providing a magnetic recording-reproducing transducer wherein a plurality of independent transducers are incorporated in a single unitary structure, such transducers being useful in recording and reproducing a plurality of adjacent record tracks on a single recording medium.

A significant problem in recording and reproducing records recorded on adjacent record tracks is the elimination of crosstalk between the tracks. The improved transducer, provided by the present invention, has provisions whereby such crosstalk is considerably reduced. The pole elements in the detachable structure described generally above are made wider than the corresponding cores to which they are magnetically coupled. Since the pole elements are larger, they provide larger record tracks, thereby transferring larger amounts of signal between the transducer and the recording medium. Since the adjacent cores coupled to the pole elements are smaller in width, they may be separated by greater distances than heretofore possible with such wide record tracks. This separation also permits the placement of a magnetic shield between the cores, which was not possible heretofore because of a lack of space between the cores. The greater separation and the shields reduce the magnetic coupling between the adjacent cores, thereby diminishing the coupling of crosstalk therebetween. In addition, the larger record tracks, containing greater amounts of signal, made possible by the invention, increase the signal to noise ratio and enhance the quality of the recording.

Consequently, it is a further object of the present invention to provide an improved magnetic recording-reproducing transducer having a plurality of independent transducer elements adapted for operation with multiple record tracks on a single recording medium, which provides less crosstalk between the tracks, higher signal to noise ratio, and enhanced recording and reproducing quality.

It is a still further object of the present invention to provide an improved magnetic recording-reproducing transducer having a detachable pole element assembly and being adapted for operation simultaneously with all record tracks on a recording medium having a plurality of record tracks thereon.

These and other objects and advantages of the present invention will, of course, become apparent and immediately suggest themselves to those skilled in the art to which the invention is directed from a reading of the following specification in connection with the accompanying drawings in which.

Figure 1:
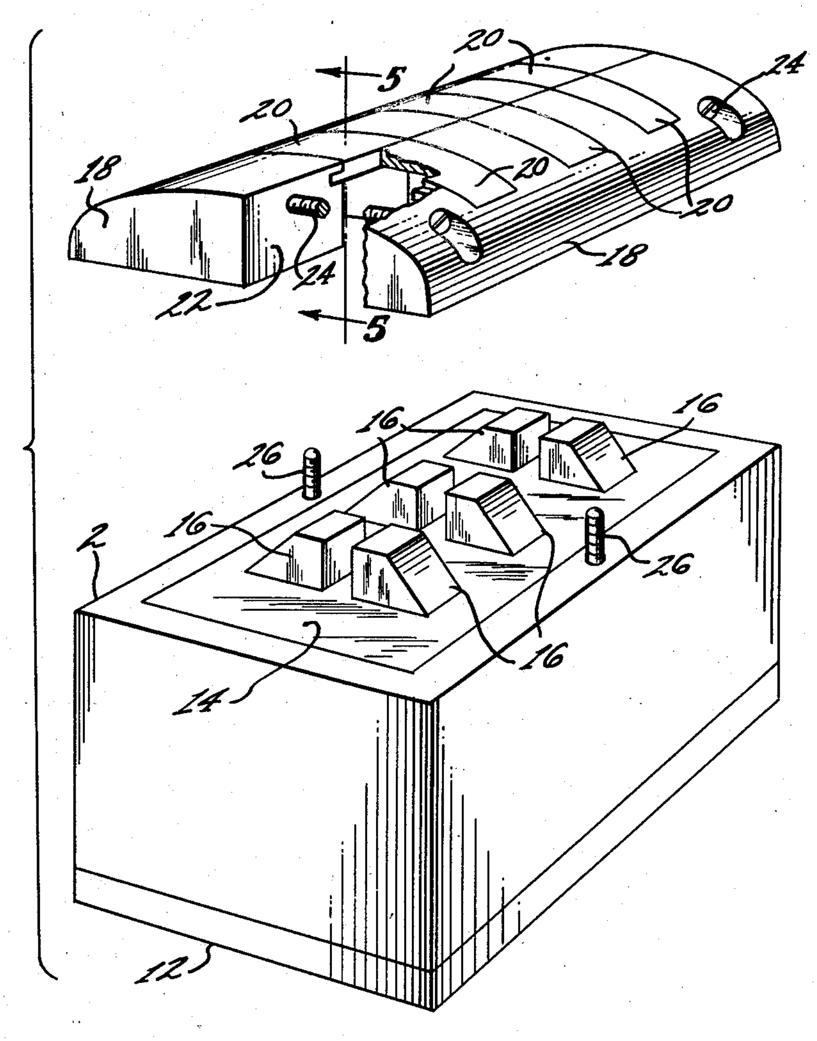
Fig. 1 is an enlarged, perspective view, in part exploded and in part broken away, of a magnetic record transducer constructed in accordance with the present invention.
Figure 2:
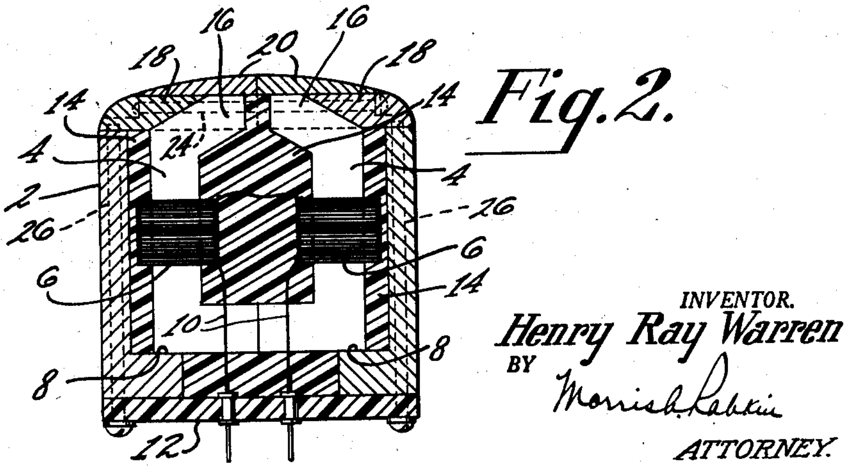
Fig. 2 is a cross-sectional view, drawn to a different scale, of the transducer shown in Fig. 1.

Referring now to the drawings in more detail, there is shown in Figs. 1 and 2, a magnetic record transducer which comprises a main housing 2 in which is mounted a plurality of main core sections 4. Three such sections are illustrated. These core sections may, of course, be made of laminated material. However, it is also contemplated that the core sections may be made of moulded ferrite material. As shown most clearly in Fig. 2, the core sections 4 are made in two similar halves placed in face-to-face relation with signal translating coils 6 mounted on the core section halves. The lower ends of the core sections 4 are supported in the housing 2 by a shoulder 8 therein. The core sections 4 define a rather large gap at the upper ends thereof (as shown in the drawing). Leads 10 are brought out from the signal translating coils 6 through a suitable nonconductive base member 12. With the base member 12 held in position, the main housing 2 is filled with a suitable casting plastic 14 which firmly secures the core sections 4 and the base 12 in proper position with respect to the housing. It will be noted in this illustrative embodiment that the tips of the core sections 4 protrude above the level of the main housing 2 and of the casting plastic 14, thus constituting exposed pole portions 16 of the core sections.

The pole element assembly comprises two similar non-magnetic pole element support members 18 which are arranged to be positioned in face-to-face relationship. These support members 18 are provided with suitable slots into which are positioned and supported the magnetic pole elements 20. These pole elements 20 may be made of any suitable structure or material, however, one example of a transducer embodying the present invention includes magnetic inserts of single pieces of an aluminum-iron alloy, referred to as alphenol, which exhibits the properties of being physically hard but is magnetically soft. An alloy consisting of 16% aluminum and the remainder iron which has been heat treated for maximum initial permeability has been found suitable. Reference may be had to the following publications for further information on alphenol: Navord Report 2819, dated April 9, 1953, and Navord Report 4130, dated December 5, 1955, entitled, "Fabrication and Properties of 16-Alphenol, a Non-Strategic Aluminum Iron Alloy." Both publications are issued by the U.S. Naval Ordnance Laboratory, White Oak, Maryland. In the illustrative embodiment, each of the pole element support members 18 is provided with three such pole elements 20 disposed in the slots therein. Each pole element corresponds to a core section 4 in the main housing 2 of the transducer. Each of the pole elements 20 extends at least out to the edge of the support member 18 and constitutes a signal gap defining face 22. Below the pole elements 20 there is provided a recess for the reception into the pole element structure of the pole portions 16 of the core sections 4 in the main housing 2.

Since the two halves of the pole assembly are separable, the entire gap defining face may be dressed and lapped to the required degree of fineness necessary to produce the desired signal gap characteristic. Since all of the pole elements are rigidly secured in the associated support member, they are adapted to be simultaneously dressed. The resultant gaps in the several transducer sections defined by this interface will be in exact alignment and orientation. After the gap defining faces 22 have been dressed, the two halves of the assembly are placed in face-to-face relationship and secured together by suitable means such as the transverse screws 24. Suitable gap spacers, such as very thin beryllium copper or a deposited layer of thorium oxyfluoride, may be placed between the gap defining ends of the pole elements to constitute a non-magnetic gap therebetween. With the pole structure thus assembled, it may be positioned on the main transducer body 2 with the pole portions 16 extending into the recesses provided below the pole elements 20. The extending pole portions 16 of the core section 4 are preferably adapted to engage the undersurface of the pole elements. Thus positioned, the pole element assembly may be securely held in that position by suitable means such as the hold-down screws 26.

The pole element assembly constructed in the manner herein set forth lends itself readily to the reproduction of substantially identical spare or replacement parts. Thus when the pole element assembly of one particular structure has been used until the pole elements are sufficiently worn as to no longer perform satisfactoriliy, the pole assembly may be readily discarded and replaced by a new assembly which is substantially identical with the original assembly.

Figure 5:
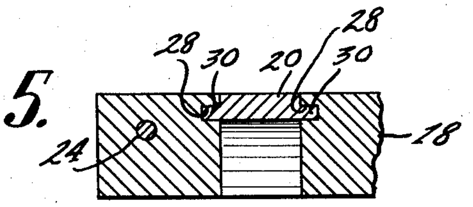
Fig. 5 is a fragmentary view in cross-section, taken along the line 5—5 of Fig. 1 as viewed in the direction of the arrows.

Referring now to Fig. 5, there is shown on an enlarged scale one proposed means for securing the pole elements 20 in the slots in the pole element support members 18. The pole element support members are provided with a transverse key slot 28 for receiving each of the pole elements 20. Each pole element 20 is provided with side flanges 30 which are complementary of the key slots 28. Thus, when the elements 20 are positioned and placed in the assembled pole element support member 18, they are securely locked therein.

Figure 6:
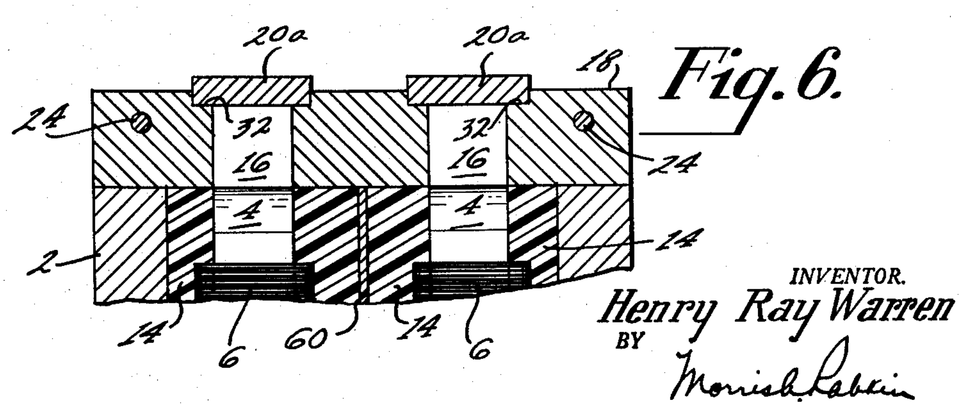
Fig. 6 is a fragmentary view somewhat similar to the view of Fig. 5, but taken with the structure in assembled relationship, and showing different means for securing the pole elements in the support structure.

A somewhat simpler structure illustrating other advantages and features provided by the invention is shown in Fig. 6. The surface of the pole element support members 18 adjacent the sides of the slots is provided with notches 32 to provide a seat for the pole elements 20*a*. The pole elements 20*a* may be secured in the notches 32 by means of thermosetting cement, for example. The pole portions 16 of the core sections 4 are in contact with the bottom of the pole elements 20a. It may be observed, however, that the pole elements 20a are wider than the pole portions 16 and the core sections 4. With the arrangement shown in Fig. 6, the pole elements being wider than the core sections and the elements being active across the entire width thereof, a record track will be produced on an associated record member which is wider than would be encountered if the pole element arrangement were of the same width as the core sections 4. This provides a measure of improvement in the signal to noise ratio by increasing the signal transferred between the record member and the transducer. At the same time more efficient use of the surface of the record member is made by permitting the adjacent tracks to be closer together while still allowing sufficient space between the core elements for the accommodation of the signal translating coils 6 on the core sections 4. A problem in multi-track recording is crosstalk between adjacent tracks. It has been found that crosstalk can be significantly reduced without execssive separation of the tracks and adjacent core sections 4 by use of a shield 60 made of any high permeability soft magnetic material disposed between the adjacent core sections 4. It is believed tht cross-talk between the tracks is due to a large degree to inductive coupling between the adjacent tracks through the core sections 4. Consequently, the magnetic shield 60 is used to decrease the inductive coupling between the core sections 4. Moreover, separation of the adjacent core sections 4 to decrease the coupling therebetween without decreasing the width of the adjacent record tracks is provided, by means of the present invention, with pole elements 20a that are wider than the core sections 4.

Figures 3, 4:
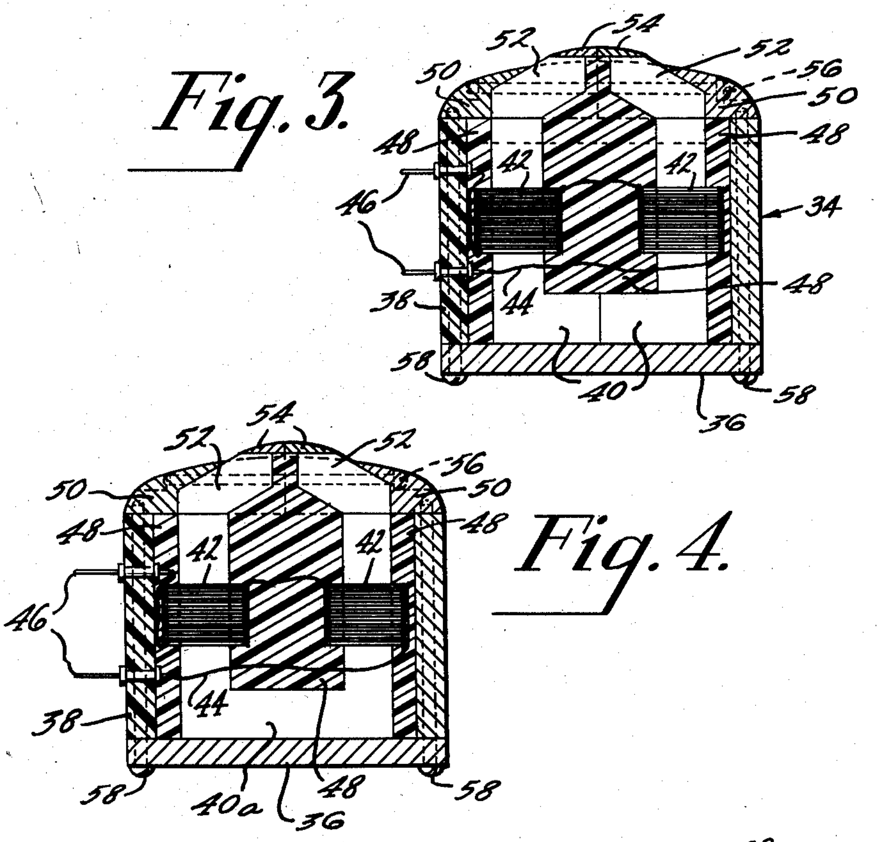
Fig. 3 is a cross-sectional view of a different form of transducer embodying the present invention.
Fig. 4 is a view of still another structure embodying the present invention.

In Fig. 3, there is shown a somewhat different form of transducer structure which embodies the present invention. There is again provided a main housing 34 and a base member 36. One side of the main housing includes a nonconductive terminal strip 38. The main core sections 40, which are somewhat similar to the previously described main core sections 4, are positioned in the main housing and carry suitable translating coils 42. In the construction shown in Fig. 3, the main core sections 40 comprise a pair of L-shaped core members which, as before, may be either of laminated construction or may be made of ferrite material. These two core members are placed in face-to-face relationship to define a substantially U-shaped core section. Suitable leads 44 connect the signal coils on the core sections to terminal pins 46 extending through the terminal strip 38. This assembly is positioned with a suitable casting plastic 48 which fills the main housing 34. This structure differs primarily from the previously described structure in that the upper ends of the core sections 40 terminate flush with the surface of the casting plastic 48 or of the main housing. However, these upper ends of the core section 40 remain exposed, as indicated in the drawing.

The pole element assembly again comprises a pair of similar support members 50 provided with slots into which are fitted the pole elements 52. In this illustrative embodiment, the pole elements 52 are somewhat different from those previously described. Here, a portion of the pole element may be made of the same material and construction as the main core sections, that is, either of laminated material or of ferrite material. The upper surface of this portion of the pole element has a pole tip 54 made of a suitable magnetic material, such as the aforementioned alphenol, cemented thereto. This is particularly desirable when the first mentioned portion of the pole cap element is made of ferrite material, since ferrite materials are characterized in that they are difficult to machine to an accurate and clean pole element and gap. The pole elements in this instance may be arranged to protrude beyond the surface of the support member 50. In certain applications, this arrangement is found more desirable than the type wherein the pole elements are flush with the support member. Here again each of the two halves of the pole element assembly have gap defining faces which are properly dressed and lapped before being placed in face-to-face relation and secured together, as by the screws 56.

In Fig. 4, there is shown still another structure which embodies the present invention. This structure is substantially identical with that shown in Fig. 3 with the exception that each of the main core sections 40a is made of a single U-shaped element rather than two L-shaped elements placed in face-to-face relation, as in Fig. 3. The straight core legs permit coils 42 to be placed thereon and the magnetic circuit completed through the pole element assembly which is the same as that shown in Fig. 3. This assembly eliminates the usual back gap which has become common in signal transducers not provided with the detachable pole element assembly of the present invention. In both of these structures, the assembled pole element assemblies are placed on the main housing and held in position by any suitable means permitting them to be readily detachable. In the illustrated embodiments, the screws 58 constitute such a means.

Thus, there has been provided an improved magnetic record transducer which features a replacable pole element assembly wherein the pole elements may be properly dressed to the necessary degree of fineness to produce accurate and well defined signal gaps, even when a plurality of independent transducers are incorporated into a single unitary structure.

What is claimed is:

1. A magnetic record transducer unit comprising a main body assembly and a pole element assembly, said main body assembly including a core structure, end faces defined by said core structure, said pole element assembly including a pair of support members having openings therein, said openings extending to a side of said members, pole elements secured in said openings, said pole elements being composed of magnetic material, means for securing said pair of support members to each other with said sides abutting and with said pole elements aligned in face to face relation to form a signal gap therebetween, and means for detachably securing said pole element assembly to said main body assembly with said pole elements magnetically coupled to said end faces of said core structure.

2. A magnetic record transducer unit according to claim 1 wherein said magnetic material is alphenol.

3. A magnetic record transducer unit comprising a main body assembly and a pole element assembly, said main body assembly including a plurality of core structures having exposed ends, said pole element assembly including a pair of support members having slots therein opening at a side surface thereof, pole elements in said slots with at least a portion of the ends thereof flush with said side surfaces, means for securing said pair of support members together with said side surfaces in face to face relationship and with said pole element ends aligned to define signal gaps therebetween, a pair of abutting ones of said pole elements being provided for each of said core structures, said pole elements being wider than said core structures corresponding thereto, and means for detachably securing said pole element assembly to said main body assembly with said pole elements magnetically coupled to said exposed ends of corresponding ones of said core structures.

4. A transducer unit according to claim 3 wherein said pole elements are composed of alphenol.

5. A magnetic record transducer unit comprising a main body assembly and a pole element assembly, said main body assembly including a housing member, a plurality of core structures securely mounted in said housing member, each of said core structures having signal translating means coupled thereto, said housing being filled with plastic material surrounding said core structures and said signal translating means, said core structures each having exposed pole portions flush with the surface of said plastic material and of said housing, said pole element assembly including a pair of support members having slots therein, said slots extending into said members from a side thereof, pole elements secured in said slots with an end thereof exposed from said members at said side thereof, portions of said slots being of greater dimension in width at said pole portions of said core structures, said pole elements being substantially as wide as said portions of said slots, said pole elements having a lower portion positioned for engagement with said exposed pole portions of said core structures, and means for securing said support members together with said sides thereof in face to face relation and with said pole portions aligned to form signal gaps therebetween, and means for detachably securing said pole element assembly to said main body assembly.

6. A replaceable pole assembly for a magnetic record transducer having a plurality of spaced core structures comprising a pair of support members, each of said members having a plurality of slots corresponding in number to the number of said core structures, the center to center spacing of said slots being equal to the center to center spacing between adjacent ones of said core structures, pole elements secured in said slots, said pole elements being of greater width than said core structures, means for securing said support members in face-to-face relation with said pole elements aligned to form signal gaps therebetween, and means for securing said assembly with respect to said core structures whereby each of said pole elements magnetically contacts the one of said core structures corresponding in position to the slot in which said element is secured.

7. A pole assembly for a magnetic record transducer adapted to cooperate with a plurality of spaced core structures, said core structures each having exposed pole portions extending in the same direction, said pole assembly comprising a plurality of pole elements, each of said pole elements having end surfaces, lower surfaces, upper surfaces and opposite sides, said upper surfaces being adapted to cooperate with a magnetic record member, said lower surfaces being adapted to engage said exposed pole portions of said core structures, the width of each of said pole elements between the sides thereof being greater than the width of the one of said core structures adapted to be engaged by said pole element, and means for securing said pole elements together in pairs with said end surfaces thereof aligned to define signal gaps therebetween.

8. A magnetic record transducer comprising a core structure of magnetic material having spaced apart pole portions, a pair of pole elements, said pole elements having end surfaces, the width of said pole elements being greater than the width of said core structure, said pole elements engaging different ones of said pole portions and extending from said pole portions towards each other, said pole elements being disposed with said end surfaces aligned to define a signal gap therebetween active across the entire width thereof.

9. A magnetic record transducer comprising a plurality of spaced core structures, each of said core structures including a U-shaped member having upstanding leg portions, the ends of said leg portions being spaced from each other, pole elements adapted to engage each of said ends of said core structures, said pole elements being wider than said core structures and having end surfaces, means for securing said pole elements to said ends of said core structure legs with said pole elements extending therefrom and with said end surfaces thereof aligned to provide signal gaps therebetween simultaneously active across the entire width thereof, and signal coils wound around each of said core structures.

10. A magnetic record transducer unit as defined in claim 5 wherein said pole elements have upper surfaces, pole tip portions cemented to said upper surfaces, said pole tip portions being aligned with said pole elements to form signal gaps therebetween.

References Cited in the file of this patent

UNITED STATES PATENTS

| | | |
|---|---|---|
| 1,366,979 | Ullrich | Feb. 1, 1921 |
| 2,432,162 | Jones | Dec. 9, 1947 |
| 2,711,945 | Kornei | June 28, 1955 |
| 2,726,952 | Morgan | Dec. 13, 1955 |
| 2,756,280 | Rettinger | July 24, 1956 |
| 2,761,910 | Sher | Sept. 4, 1956 |
| 2,769,866 | Kornei | Nov. 6, 1956 |
| 2,801,942 | Nachman | Aug. 6, 1957 |
| 2,806,904 | Atkinson et al. | Sept. 17, 1957 |
| 2,831,180 | Hasbrouck | Apr. 15, 1958 |

FOREIGN PATENTS

| | | |
|---|---|---|
| 725,830 | Germany | Sept. 30, 1942 |
| 290,640 | Switzerland | Aug. 1, 1953 |
| 1,055,860 | France | Oct. 21, 1953 |

OTHER REFERENCES

Sendai Tohoku University Science Reports, Series A, No. 3, 1951, pages 523–534.